R. B. JAMESON.
Instrument for Suckering Tobacco-Plants.
No. 197,857. Patented Dec. 4, 1877.
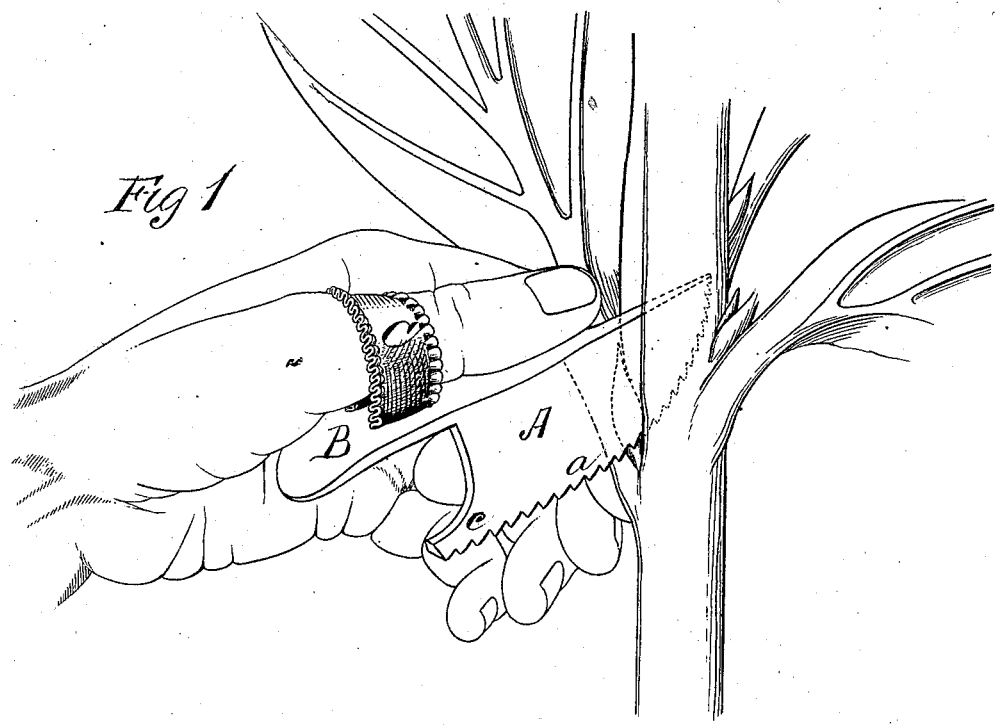
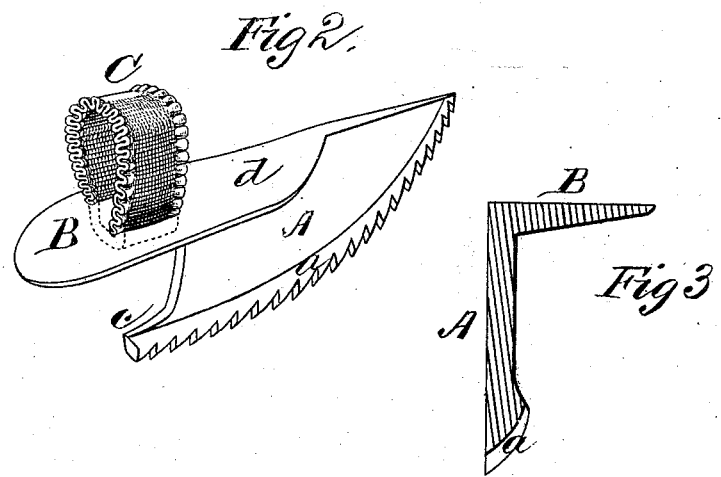
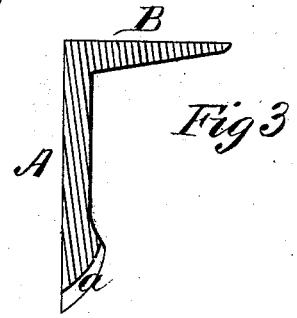

UNITED STATES PATENT OFFICE.

ROBERT B. JAMESON, OF SOUTH UNION, KENTUCKY.

IMPROVEMENT IN INSTRUMENTS FOR SUCKERING TOBACCO-PLANTS.

Specification forming part of Letters Patent No. 197,857, dated December 4, 1877; application filed September 22, 1877.

*To all whom it may concern:*

Be it known that I, ROBERT B. JAMESON, of South Union, in the county of Logan and State of Kentucky, have invented a new and valuable Improvement in Devices for Germing and Suckering Tobacco; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my improved suckering-tool in operation. Fig. 2 is a like view of the same detached; and Fig. 3 is a cross-sectional view of the same.

This invention has for its object the improvement of means for suckering tobacco-plants—that is, for cutting off the superfluous shoots and germs, in order that the remaining leaves may receive the full nutriment requisite to their proper development.

The nature of the invention consists in a metallic blade, having a curved beveled serrated edge, a thumb-ledge at right angles to said blade, and a thumb-stall or loop, as hereinafter more fully set forth.

In the annexed drawings, the letter A designates a metallic blade of suitable size, having a convex beveled saw-toothed edge, $a$, and presenting the general appearance of a skate-runner. The teeth of this blade are reversed—that is, their bite is from front to rear, and the cutting action is produced by a backward movement of the same.

B represents a thumb-ledge, arranged at right angles to the plane of the blade A, and formed, preferably, in one piece therewith. This ledge extends somewhat beyond the heel $c$ of the blade, and its front beveled edge terminates in rear of the point thereof, thus facilitating the introduction of the said blade between the stalk and sucker.

C represents a loop or thumb-stall, rigidly secured to the ledge aforesaid, near its rear end. This loop is made of any sufficiently strong and elastic material, and is secured to the ledge by having the ends of a strip of the said material passed through two parallel longitudinal slots in the said ledge, and then securing the said ends together.

I do not wish to confine myself to this special mode, however, as there are many means adapted to answer the same purpose.

In the use of this improved instrument, which is made both right and left handed, the thumb is passed through the loop until the latter is between the knuckle and joint, the ball of the thumb being received in a depression, $d$, of the ledge, in front of the said loop. The blade is then inserted between the stalk of the plant and the sucker, and the fore-finger placed under the latter. The joint of the thumb is then vigorously flexed, thereby imparting a rearward motion to the blade, and severing the sucker neatly from the plant and destroying the germ of the second growth of suckers.

By this means the labor of suckering the plants is greatly lessened, and the time and expense of removing the second growth entirely saved.

What I claim as new, and desire to secure by Letters Patent, is—

1. An instrument for suckering tobacco-plants, consisting of the serrated blade A, the side ledge B, and the thumb-loop C, substantially as specified.

2. The suckering instrument for tobacco-plants, consisting of the blade A, having a convex beveled serrated edge, $a$, the thumb-ledge B, extending in rear of said blade and terminating in rear of its front, and the thumb-loop C, secured to said ledge, substantially as specified.

In testimony that I claim the above I have hereunto subscribed my name in the presence of two witnesses.

ROBERT BURNS JAMESON.

Witnesses:
JOSIAH M. McLAIN,
JAMES ALBURT FLEMING.